(12) United States Patent
Hiratsuka (10) Patent No.: US 10,678,485 B2
(45) Date of Patent: Jun. 9, 2020

(54) IMAGE FORMING APPARATUS FROM WHICH CONFIDENTIAL DOCUMENT IS UNREMOVABLE BY PERSON DIFFERENT FROM USER, AND NON-TRANSITORY COMPUTER READABLE RECORDING MEDIUM THAT RECORDS INFORMATION PROCESSING PROGRAM FROM WHICH CONFIDENTIAL DOCUMENT IS UNREMOVABLE BY PERSON DIFFERENT FROM USER

(71) Applicant: KYOCERA DOCUMENT SOLUTIONS INC., Osaka (JP)

(72) Inventor: Motoki Hiratsuka, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/249,632

(22) Filed: Jan. 16, 2019

(65) Prior Publication Data
US 2019/0227756 A1 Jul. 25, 2019

(30) Foreign Application Priority Data

Jan. 19, 2018 (JP) ................................. 2018-006842

(51) Int. Cl.
*G06F 3/12* (2006.01)
*H04N 1/00* (2006.01)
*G03G 15/00* (2006.01)

(52) U.S. Cl.
CPC .......... *G06F 3/1222* (2013.01); *G06F 3/1238* (2013.01); *G06F 3/1292* (2013.01);
(Continued)

(58) Field of Classification Search
None
See application file for complete search history.

(56) References Cited

U.S. PATENT DOCUMENTS

| 2008/0170256 A1* | 7/2008 | Matsuhara | G06F 3/1207 358/1.15 |
| 2010/0046015 A1* | 2/2010 | Whittle | G06F 3/1222 358/1.9 |

(Continued)

FOREIGN PATENT DOCUMENTS

| JP | 2008-229913 A | 10/2008 |
| JP | 2010-016438 A | 1/2010 |
| JP | 2016-132174 A | 7/2016 |

*Primary Examiner* — Miya J Williams
(74) *Attorney, Agent, or Firm* — Li & Cai Intellectual Property (USA) Office (57) ABSTRACT

Apparatus determines whether a number-of-sheet(s) of the paper required to form an image based on the printable data is equal to or larger than a threshold or smaller than the threshold, if it is determined that the number-of-sheet(s) of the paper is smaller than the threshold, determines whether a distance from the user is equal to or larger than a first distance or smaller than the first distance, if it is determined that the distance from the user is smaller than the first distance, controls the printer to form the image on the paper, and if it is determined that the distance from the user is equal to or larger than the first distance, if it is determined that the distance from the user is changed such that the distance from the user is smaller than the first distance, controls the printer to form the image on the paper.

5 Claims, 5 Drawing Sheets

(52) U.S. Cl.
CPC ..... *H04N 1/00323* (2013.01); *G03G 15/5091* (2013.01); *G06F 3/1267* (2013.01); *H04N 2201/0094* (2013.01)

(56) References Cited

U.S. PATENT DOCUMENTS

| | | | | |
|---|---|---|---|---|
| 2010/0214585 A1* | 8/2010 | Tanji | ................ | G03G 15/6552 358/1.12 |
| 2010/0245900 A1* | 9/2010 | Morimoto | ............ | G06F 3/1222 358/1.15 |
| 2010/0290069 A1* | 11/2010 | Hirose | .................. | G06K 15/02 358/1.12 |
| 2014/0070002 A1* | 3/2014 | Pineau | .................... | G06K 5/00 235/382 |
| 2016/0028912 A1* | 1/2016 | Harada | ............. | H04N 1/00923 358/1.15 |
| 2016/0127592 A1* | 5/2016 | Nakamura | ........ | H04N 1/00923 358/1.13 |
| 2016/0381242 A1* | 12/2016 | Arakawa | ........... | H04N 1/00915 358/1.14 |
| 2017/0155793 A1* | 6/2017 | Masumoto | ........... | G06F 3/1204 |
| 2018/0004463 A1* | 1/2018 | Masumoto | ........... | G06F 3/1204 |

* cited by examiner

IMAGE FORMING APPARATUS FROM WHICH CONFIDENTIAL DOCUMENT IS UNREMOVABLE BY PERSON DIFFERENT FROM USER, AND NON-TRANSITORY COMPUTER READABLE RECORDING MEDIUM THAT RECORDS INFORMATION PROCESSING PROGRAM FROM WHICH CONFIDENTIAL DOCUMENT IS UNREMOVABLE BY PERSON DIFFERENT FROM USER

CROSS REFERENCE TO RELATED APPLICATION

This application claims the benefit of Japanese Priority Patent Application JP 2018-006842 filed Jan. 19, 2018, the entire contents of which are incorporated herein by reference.

BACKGROUND OF THE INVENTION

1. Field of the Invention

The present disclosure relates to an image forming apparatus with high security. The present disclosure further relates to a non-transitory computer readable recording medium that records an information processing program.

2. Description of Related Art

There is known an image forming apparatus with security that makes a confidential (nondisclosed) document unremovable by a different person.

A plurality of users use an image forming apparatus. In view of the aforementioned circumstances, it is desirable to provide an image forming apparatus that is user-friendly for a plurality of users, while a confidential (nondisclosed) document is unremovable from a different person, i.e., while the image forming apparatus has security.

SUMMARY OF THE INVENTION

According to an embodiment of the present disclosure, there is provided an image forming apparatus, including:
a network communication device capable of communicating with an information processing apparatus connected to a network;
a printer capable of forming an image on a paper;
a lock mechanism that locks the paper on which the image is formed by the printer such that the paper is unremovable; and
a processor that
obtains printable data from the information processing apparatus, a user having logged in to the information processing apparatus,
determines whether a number-of-sheet(s) of the paper required to form an image based on the printable data is equal to or larger than a threshold or smaller than the threshold,
if it is determined that the number-of-sheet(s) of the paper is smaller than the threshold, determines whether a distance from the user is equal to or larger than a first distance or smaller than the first distance,
if it is determined that the distance from the user is smaller than the first distance, controls the printer to form the image on the paper, and
if it is determined that the distance from the user is equal to or larger than the first distance, and if it is determined that the distance from the user is changed such that the distance from the user is smaller than the first distance, controls the printer to form the image on the paper.

According to an embodiment of the present disclosure, there is provided a non-transitory computer readable recording medium that records an information processing program executed by a processor of an image forming apparatus including
a network communication device capable of communicating with an information processing apparatus connected to a network,
a printer capable of forming an image on a paper, and
a lock mechanism that locks the paper on which the image is formed by the printer such that the paper is unremovable,
the information processing program causing the processor of the image forming apparatus to:
obtain printable data from the information processing apparatus, a user having logged in to the information processing apparatus;
determine whether a number-of-sheet(s) of the paper required to form an image based on the printable data is equal to or larger than a threshold or smaller than the threshold;
if it is determined that the number-of-sheet(s) of the paper is smaller than the threshold, determine whether a distance from the user is equal to or larger than a first distance or smaller than the first distance;
if it is determined that the distance from the user is smaller than the first distance, control the printer to form the image on the paper; and if it is determined that the distance from the user is equal to or larger than the first distance, and if it is determined that the distance from the user is changed such that the distance from the user is smaller than the first distance, control the printer to form the image on the paper.

These and other objects, features and advantages of the present disclosure will become more apparent in light of the following detailed description of best mode embodiments thereof, as illustrated in the accompanying drawings.

DETAILED DESCRIPTION OF THE PREFERRED EMBODIMENTS

Hereinafter, an embodiment of the present disclosure will be described with reference to the drawings.

1. Configuration of Information Processing System

Figure 1:
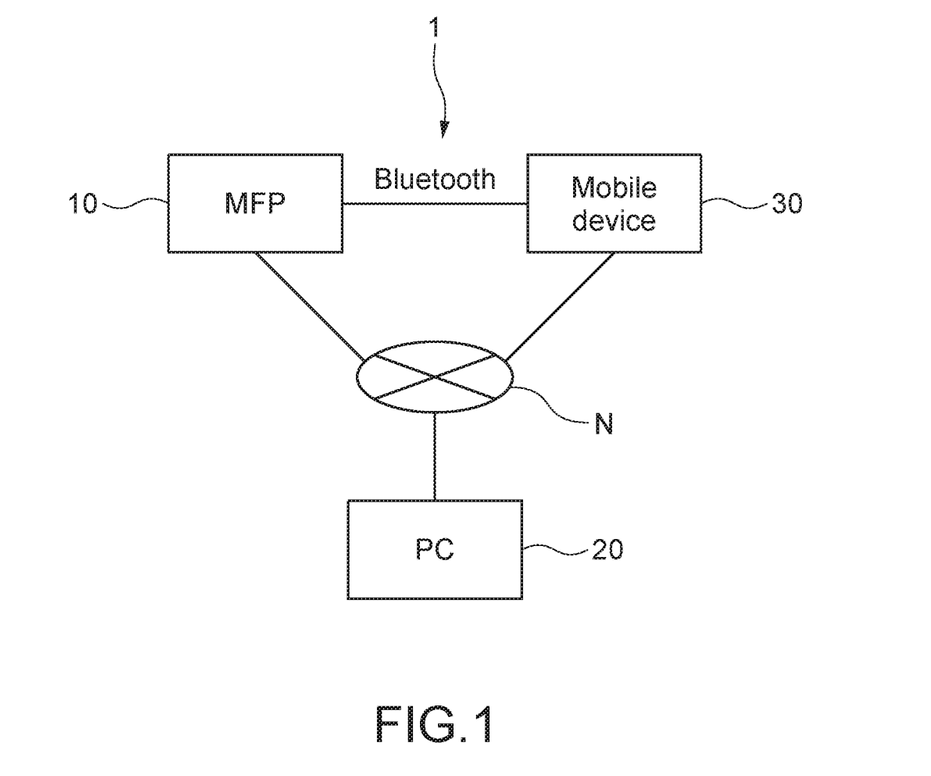
FIG. 1 schematically shows an information processing system according to an embodiment of the present disclosure.

FIG. 1 schematically shows an information processing system according to an embodiment of the present disclosure.

The information processing system 1 includes the image forming apparatus 10, the information processing apparatus 20, and the mobile device 30. The image forming apparatus 10, the information processing apparatus 20, and the mobile device 30 are connected to the network N such as the Internet or a LAN (Local Area Network), and capable of communicating with each other.

The image forming apparatus 10 is, typically, an MFP (Multifunction Peripheral), and will be referred to as the MFP 10 hereinafter. The MFP 10 includes a Bluetooth (registered trademark) transmitter device (beacon). The Bluetooth (registered trademark) transmitter device (beacon) is based on a standard of near field communication, and transmits radio waves periodically.

The information processing apparatus 20 sends printable data to the MFP 10. The information processing apparatus 20 is, typically, a desktop computer, a laptop computer, a tablet computer, or the like, and will be referred to as the PC (Personal Computer) 20 hereinafter.

The mobile device 30 is a smartphone, a wearable computer, a laptop computer, a tablet computer, or the like. The mobile device 30 is capable of receiving radio waves transmitted from the transmitter device of the MFP 10. A user (for example, a worker at an office to which the MFP 10 is provided) uses the PC 20 and the mobile device 30. In other words, one user (end user) logs in to the PC 20 and the mobile device 30 by using a common login ID, and uses the PC 20 and the mobile device 30.

2. Hardware Configuration of Image Forming Apparatus

Figure 2:
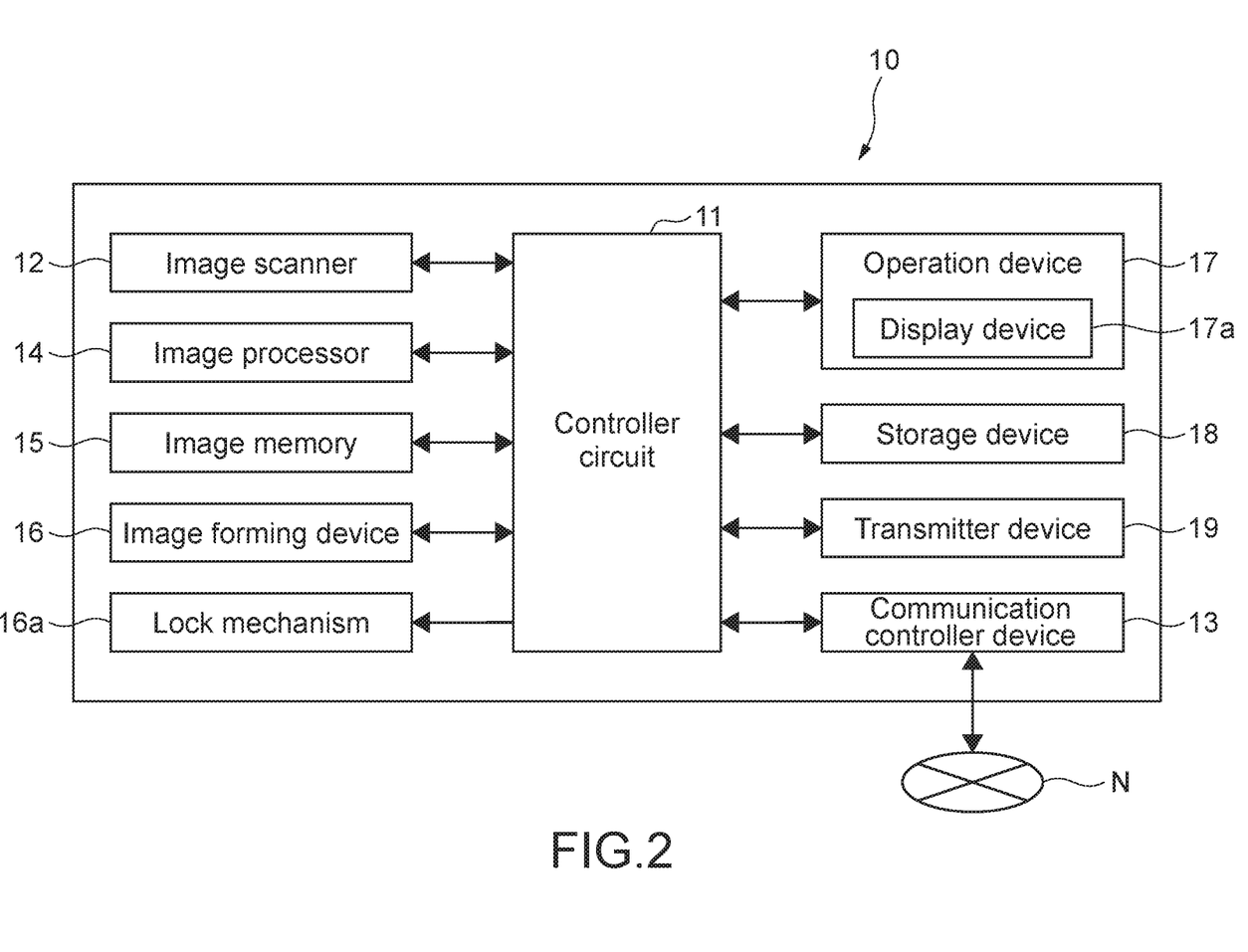
FIG. 2 shows a hardware configuration of an image forming apparatus.

FIG. 2 shows a hardware configuration of an image forming apparatus according to an embodiment of the present disclosure.

The MFP 10 includes the controller circuit 11. The controller circuit 11 includes a CPU (Central Processing Unit), a RAM (Random Access Memory), a ROM (Read Only Memory), dedicated hardware circuits, and the like and performs overall operational control of the MFP 10. A computer program that causes the MFP 10 to operate as the respective functional units (to be described later) is stored in a non-transitory computer readable recording medium such as a ROM.

The controller circuit 11 is connected to the image scanner 12, the image processor 14, the image memory 15, the image forming device 16, the lock mechanism 16a, the operation device 17, the storage device 18, the communication controller device 13, the transmitter device 19, and the like. The controller circuit 11 performs operational control of the respective devices connected thereto and sends/receives signals and data to/from those devices.

According to job execution instructions input by a user via the operation device 17 or a personal computer (not shown) connected to a network, the controller circuit 11 controls drive and processing of mechanisms requisite for executing operational control of functions such as a scanner function, a printing function, and a copy function.

The image scanner 12 reads an image from a document.

The image processor 14 carries out image processing as necessary on image data of an image read by the image scanner 12. For example, the image processor 14 corrects shading of an image read by the image scanner 12 and carries out other image processing to improve the quality of the image to be formed.

The image memory 15 includes an area that temporarily stores data of a document image read by the image scanner 12 or data to be printed by the image forming device 16.

The image forming device 16 is a printer that forms an image on paper based on image data.

The lock mechanism 16a locks paper ejected onto an ejection tray (not shown), on which an image is formed by the image forming device 16 (printer), such that the paper is physically unremovable.

The operation device 17 includes a touch panel device and an operation key device that accept user's instructions on various operations and processing executable by the MFP 1. The touch panel device includes the display device 17a such as an LCD (Liquid Crystal Display) and an organic EL (Electroluminescence) display including a touch panel.

The communication controller device 13 is an interface used for connecting to the network N.

The storage device 18 is a large-volume storage device such as an HDD (Hard Disk Drive) that stores a document image read by the image scanner 12, and the like.

The transmitter device 19 is a transmitter device of Bluetooth (registered trademark), which is one standard of near field communication. The transmitter device 19 periodically transmits radio waves (beacon).

3. Hardware Configuration of Mobile Device

Figure 3:
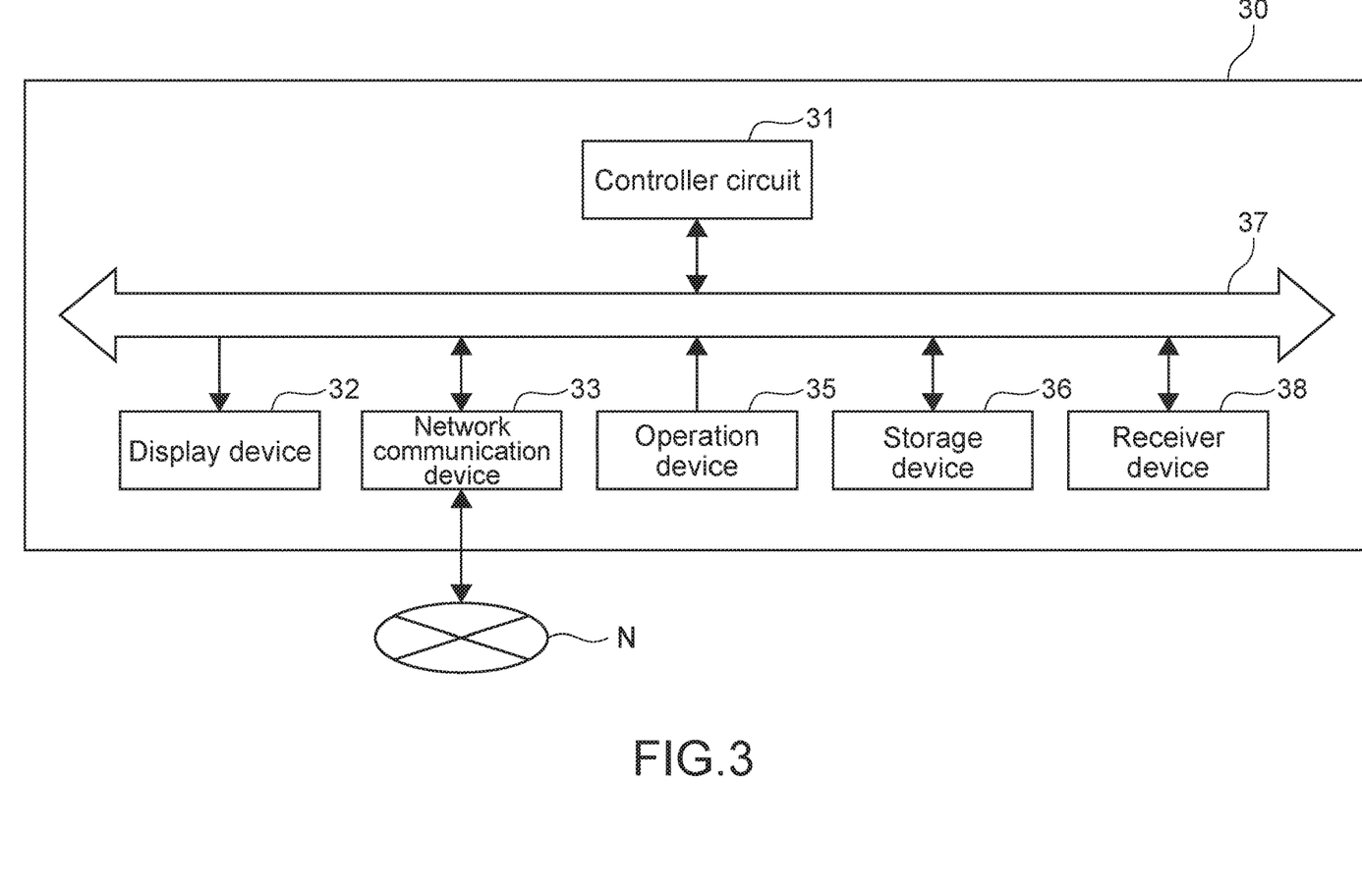
FIG. 3 shows a hardware configuration of a mobile device.

FIG. 3 shows a hardware configuration of a mobile device.

The mobile device 30 includes the controller circuit 31. The mobile device 30 further includes the display device 32, the network communication device 33, the operation device 35, the storage device 36, and the receiver device 38 connected to the controller circuit 31 via the bus 37.

The controller circuit 31 includes a CPU and the like. The CPU of the controller circuit 31 loads programs recorded in the ROM in the RAM to execute the programs, the ROM being an example of a non-transitory computer readable recording medium.

The storage device 36 includes the ROM, the RAM, and a large-volume storage device such as an HDD. The non-volatile ROM stores the programs executed by the controller circuit 31, data, and the like. The programs stored in the ROM are loaded in the RAM.

The display device 32 includes an LCD, an organic EL display, or the like. The display device 32 executes computing on a basis of information received from the controller circuit 31, and displays generated image signals on the display.

The operation device 35 includes a touch panel, various switches, and the like. The operation device 35 detects operations input by a user, and outputs information to the controller circuit 31.

The network communication device 33 is an interface for connecting to the network N.

The receiver device 38 receives radio waves transmitted by a transmitter device (beacon) of Bluetooth (registered trademark), which is one standard of near field communication.

4. Hardware Configuration of Information Processing Apparatus

A hardware configuration of the PC 20 is not shown. For example, a hardware configuration of the PC 20 is the same as the hardware configuration (FIG. 3) of the mobile device 30 except that the PC 20 does not include the receiver device

38. The CPU of the PC 20 loads programs recorded in the ROM in the RAM to execute the programs.

5. Functional Configuration of Image Forming Apparatus

Figure 4:
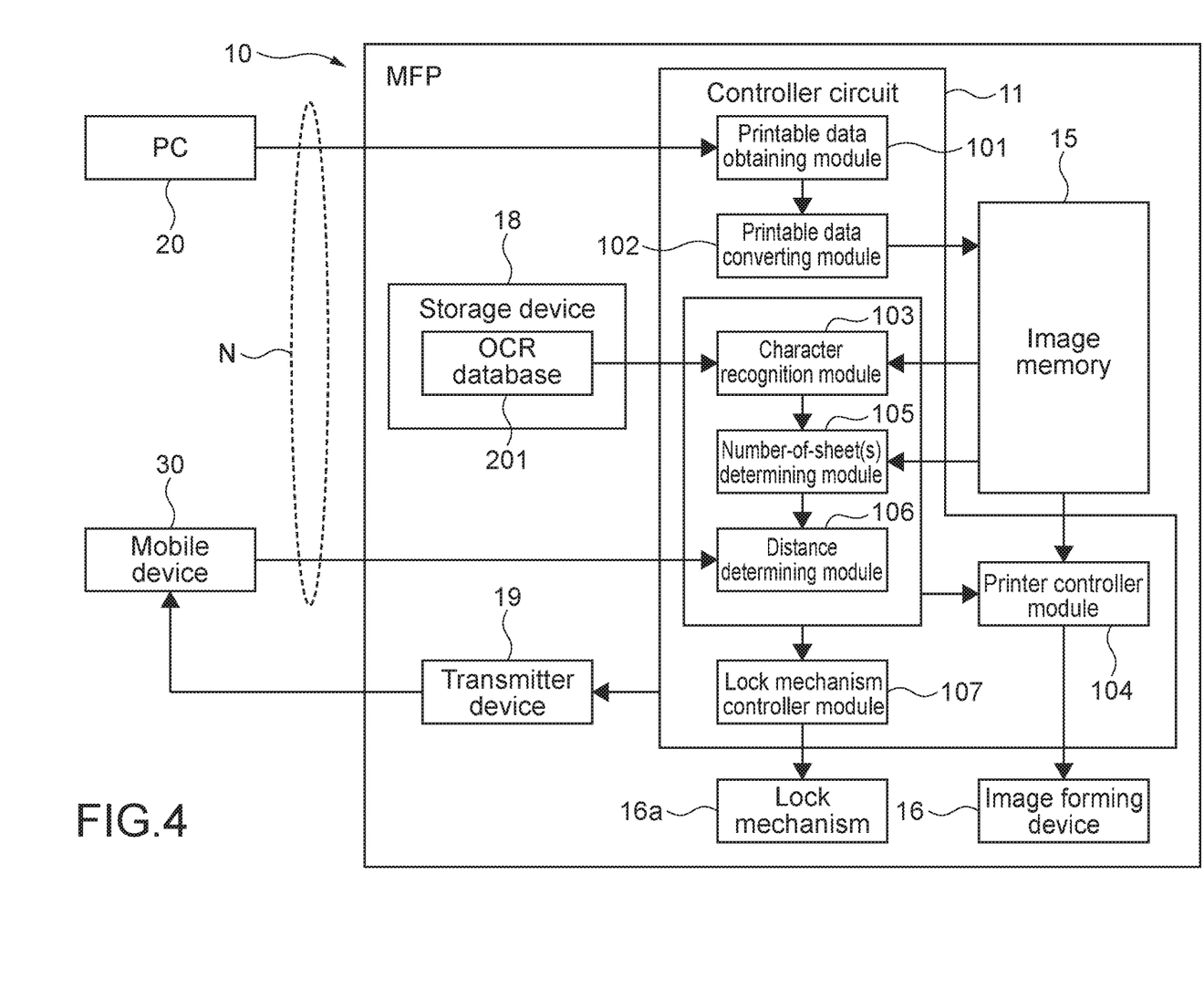
FIG. 4 shows a functional configuration of the image forming apparatus.

FIG. 4 shows a functional configuration of the image forming apparatus.

The CPU (processor) of the controller circuit 11 of the MFP 10 loads an information processing program recorded in the ROM in the RAM to execute the information processing program to thereby operate as the printable data obtaining module 101, the printable data converting module 102, the character recognition module 103, the printer controller module 104, the number-of-sheet(s) determining module 105, the distance determining module 106, and the lock mechanism controller module 107.

The printable data obtaining module 101 receives printable data from the PC 20 via the network N.

The printable data converting module 102 converts the printable data received from the PC 20 into data described in a character-recognizable format.

The character recognition module 103 extracts characters with meaning of confidence from bitmap data with reference to the OCR database 201 by means of OCR (Optical Character Recognition).

The printer controller module 104 controls the image forming device 16 (printer) to form an image.

The number-of-sheet(s) determining module 105 determines the number-of-sheet(s) of paper required to form an image (to print bitmap data) based on the printable data received from the PC 20.

The distance determining module 106 receives, from the mobile device 30 via the network N, the strength of a received radio wave (beacon) and a login ID identifying a user who has logged in to the mobile device 30. The distance determining module 106 determines a distance from the mobile device 30 to the MFP 10.

The lock mechanism controller module 107 controls the lock mechanism 16*a* to lock paper ejected onto an ejection tray (not shown), on which an image is formed by the image forming device 16 (printer), such that the paper is physically unremovable. The lock mechanism controller module 107 further controls the lock mechanism 16*a* to unlock the paper.

6. Operational Flow of Image Forming Apparatus

Figure 5:
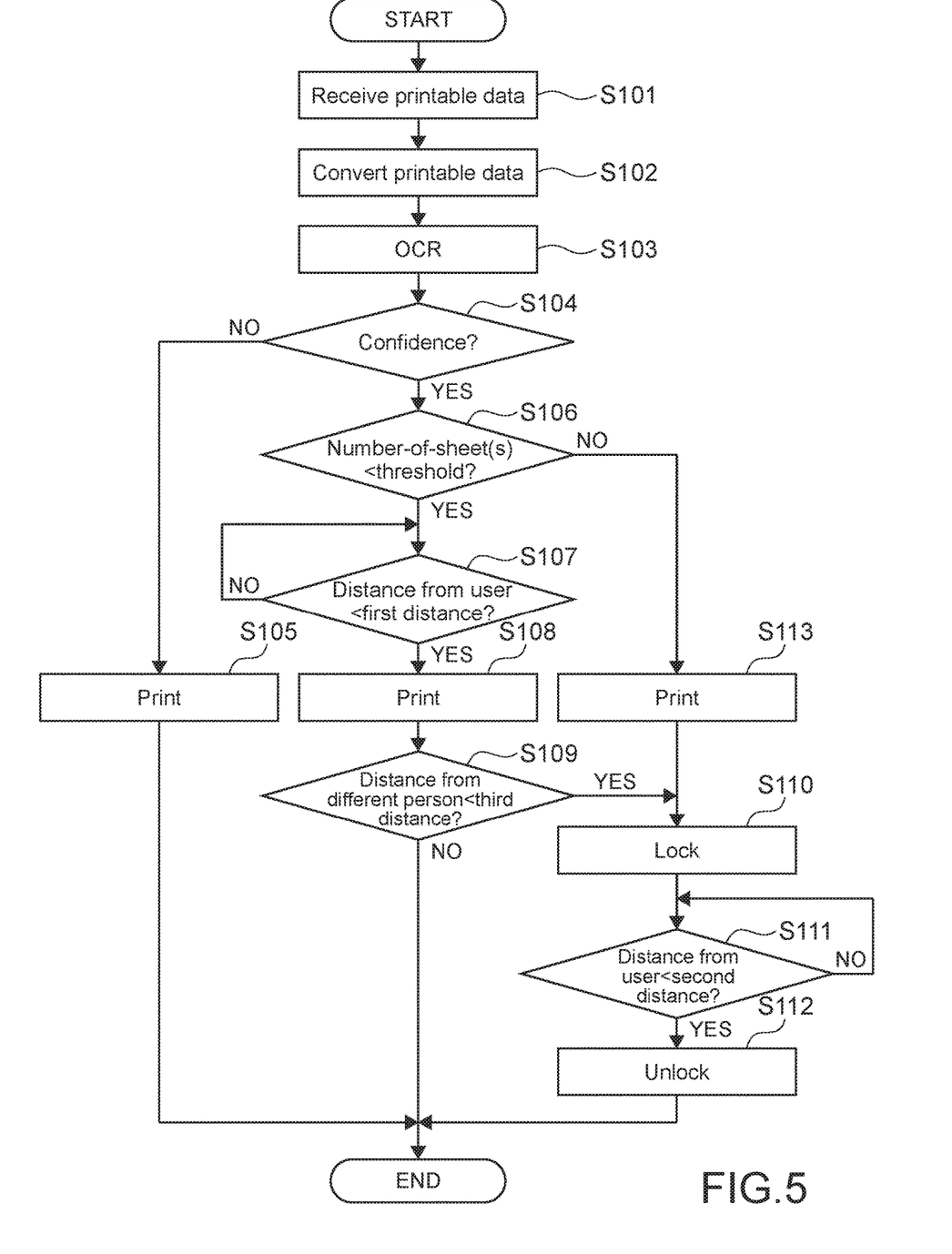
FIG. 5 shows an operational flow of the image forming apparatus.

FIG. 5 shows an operational flow of the image forming apparatus.

As a precondition, one user has logged in to the PC 20 and the mobile device 30 by using a common login ID. The user would like to print data stored in the PC 20 by using the MFP 10. The user operates the PC 20 to cause the PC 20 to send printable data to the MFP 10 via the network N.

As another precondition, the transmitter device 19 of the MFP 10 periodically transmits radio waves (beacon). The receiver device 38 of the mobile device 30 periodically receives radio waves (beacon) transmitted from the transmitter device 19 of the MFP 10. Every time the mobile device 30 receives the radio waves (beacon), the mobile device 30 sends, to the MFP 10 via the network N, the strength (the closer the higher, the farther the lower) of the received radio wave and the login ID identifying the user who has logged in to the mobile device 30. The MFP 10 periodically receives, from the mobile device 30 via the network N, the strength of the received radio wave (beacon) and the login ID identifying the user who has logged in to the mobile device 30. The MFP 10 is capable of determining, by periodically receiving the strength of radio waves (beacon) from the mobile device 30, the distance (which changes as user moves) between the MFP 10 and the mobile device 30 (user who has the mobile device 30).

The printable data obtaining module 101 receives printable data from the PC 20 via the network N (Step S101). The printable data is described in, for example, PDL (Page Description Language).

The printable data converting module 102 converts the printable data received from the PC 20 into data described in a character-recognizable format (Step S102). A specific example of the data described in a character-recognizable format is bitmap data (for example, JPEG).

The character recognition module 103 extracts characters (strictly speaking, characters' image) with meaning of confidence from bitmap data by means of OCR (Optical Character Recognition) (Step S103). Specifically, image patterns of characters with meaning of confidence are registered in the OCR database 201. The character recognition module 103 extracts characters with meaning of confidence from bitmap data with reference to the OCR database 201. Specific examples of "characters with meaning of confidence" include "internal use only", "absolute secrecy", "financial statement", "confidential", and the like. Characters may be a watermark. An HDD such as the storage device 18 stores the OCR database 201.

If the character recognition module 103 does not extract characters with meaning of confidence (Step S104, NO), the printer controller module 104 controls the image forming device 16 (printer) to form an image (Step S105). As described above, if an image is not confidential, the image is formed immediately. Meanwhile, if an image is confidential, processing with high security is executed (described below).

Meanwhile, if the character recognition module 103 extracts characters with meaning of confidence (Step S104, YES), the number-of-sheet(s) determining module 105 determines the number-of-sheet(s) of paper required to form an image (to print bitmap data) based on the printable data received from the PC 20. The number-of-sheet(s) determining module 105 determines whether the determined number-of-sheet(s) of paper is equal to or larger than a threshold or smaller than the threshold (Step S106). The threshold of the number-of-sheet(s) is a relatively large value, with which it takes relatively long time to print all the image. The threshold may be, for example, 21 or a value larger than that.

Firstly, a case where the number-of-sheet(s) determining module 105 determines that the number-of-sheet(s) of paper is smaller than the threshold (Step S106, YES) will be described. In other words, the number-of-sheet(s) of paper is a relatively small value, with which it takes relatively short time (for example, 20 seconds or less, etc.) to print all the image.

The distance determining module 106 receives, from the mobile device 30 via the network N, the strength of the received radio wave (beacon) and the login ID identifying the user who has logged in to the mobile device 30. The distance determining module 106 determines whether a distance from the mobile device 30, which has sent the login ID common to the login ID of the user who has logged in to the PC 20, to the MFP 10 is equal to or larger than a first distance or smaller than the first distance (Step S107). In other words, the distance determining module 106 determines whether a distance from the user who has logged in to the PC 20 (user who has the mobile device 30) to the MFP 10 is equal to or larger than a first distance or smaller than the first distance.

The "first distance" is variable depending on the number-of-sheet(s) of paper. Typically, the larger the number-of-sheet(s) of paper, the larger the first distance. For example, if the number-of-sheet(s) of paper is 5 or less, the first distance may be 5 meters. If the number-of-sheet(s) of paper is 20 or less, the first distance may be 20 meters. Those specific examples of are based on the presupposition that the print output speed of the MFP 10 is 60 ppm (page per minute) and a user's walk speed is 1 meter/second. In this case, the first distance may be calculated by multiplying the time period it takes to output all paper by a user's walk speed.

If it is determined that the distance from the mobile device 30 that the user has to the MFP 10 is equal to or larger than the first distance, the distance determining module 106 stands by for printing (Step S107, NO). A reason is as follows. Since the distance from the user who has the mobile device 30 to the MFP 10 is large (large with respect to number-of-sheet(s)), if the MFP 10 immediately starts printing, printed paper is put on an ejection tray before the user arrives at the MFP 10. As a result, a different person may remove the paper, which has a security problem.

The distance determining module 106 determines that the distance from the mobile device 30 that the user has to the MFP 10 is smaller than the first distance. Alternatively, the distance determining module 106 determines that the distance from the mobile device 30 that the user has to the MFP 10 is equal to or larger than the first distance, and determines that the distance from the user is changed such that the distance from the user is smaller than the first distance (Step S107, YES). Then, the printer controller module 104 controls the image forming device 16 (printer) to form an image (Step S108). A reason is as follows. Since the distance from the user who has the mobile device 30 to the MFP 10 is small (small with respect to number-of-sheet(s)), if the MFP 10 immediately starts printing, printed paper is ejected onto the ejection tray when the user arrives at the MFP 10. As a result, there is no security problem even if the paper is unlocked, and the user's wait time is not increased.

After the start of image formation, the distance determining module 106 determines whether or not there is a mobile device (i.e., mobile device that different person has) (not shown), to which a person different from the aforementioned user has logged in by using a different login ID, a distance from the mobile device of the different person to the MFP 10 being smaller than a third distance (Step S109). The third distance from the mobile device that the different person has to the MFP 10 is equal to or smaller than the first distance. In other words, the third distance may be the same as the first distance (in the aforementioned specific example, 5 meters or 20 meters) or may be smaller than the first distance (for example, 1 meter, i.e., a very small distance such that a user can access the MFP 10 with his/her hand).

The distance determining module 106 determines that there is a different person (mobile device that different person has), a distance from the different person to the MFP 10 being smaller than the third distance (Step S109, YES). In this case, the lock mechanism controller module 107 controls the lock mechanism 16a to lock the paper ejected onto the ejection tray (not shown), on which an image is formed by the image forming device 16 (printer), such that the paper is physically unremovable (Step S110). At this time, the MFP 10 may output an alert sound from a speaker (not shown).

After locking, the distance determining module 106 determines whether or not the distance from the mobile device 30, to which the aforementioned user logs in, to the MFP 10 is smaller than a second distance (Step S111). The second distance from the mobile device 30 that the user has to the MFP 10 is equal to or smaller than the first distance. In other words, the second distance may be the same as the first distance (in the aforementioned specific example, 5 meters or 20 meters) or may be smaller than the first distance (for example, 1 meter, i.e., a very small distance such that a user can access the MFP 10 with his/her hand). The second distance may be the same as or different from the third distance.

The distance determining module 106 determines that the distance from the user (the mobile device 30 that the user has) is smaller than the second distance (Step S111, YES). In this case, the lock mechanism controller module 107 controls the lock mechanism 16a to unlock the paper (Step S112). As a result, paper is physically removable by a user.

Next, a case where the number-of-sheet(s) determining module 105 determines that the number-of-sheet(s) of paper is equal to or larger than the threshold (Step S106, NO) will be described. In other words, the number-of-sheet(s) of paper is a relatively large value, with which it takes relatively long time to print all the image.

In this case, the printer controller module 104 controls the image forming device 16 (printer) to form an image (Step S113). As described above, the threshold of the number-of-sheet(s) of paper is a relatively large value, with which it takes relatively long time to print all the image. Because of this, printing is started immediately in order not to increase the user's wait time.

After the printing, the lock mechanism controller module 107 controls the lock mechanism 16a to lock the paper ejected onto the ejection tray (not shown), on which an image is formed by the image forming device 16 (printer), such that the paper is physically unremovable (Step S110). A reason is as follows. If the MFP 10 immediately starts printing, printed paper is put on the ejection tray before the user arrives at the MFP 10. As a result, a different person may remove the paper, which has a security problem.

After locking, the distance determining module 106 determines whether or not the distance from the mobile device 30, to which the aforementioned user logs in, to the MFP 10 is smaller than a second distance (Step S111). The distance determining module 106 determines that the distance from the user (the mobile device 30 that the user has) is smaller than the second distance (Step S111, YES). In this case, the lock mechanism controller module 107 controls the lock mechanism 16a to unlock the paper (Step S112). As a result, paper is physically removable by a user.

7. Modification Examples

According to the present embodiment, the "first distance" is variable depending on the number-of-sheet(s) of paper. Typically, the larger the number-of-sheet(s) of paper, the larger the first distance. Instead, the "first distance" may be a fixed value irrespective or the number-of-sheet(s) of paper.

According to the present embodiment, one user logs in to the PC 20 and the mobile device 30 by using the common login ID to use the PC 20 and the mobile device 30. The PC 20 sends printable data to the MFP 10 via the network N. The mobile device 30 receives the radio waves (beacon) transmitted from the MFP 10, and sends the strength of the radio waves to the MFP 10 via the network N. Instead, the PC 20 and the mobile device 30 may be a single mobile device (not shown). In other words, a single mobile device may send printable data to the MFP 10 via the network N, receive the radio waves (beacon) transmitted from the MFP 10, and send the strength of the radio waves to the MFP 10 via the network N.

8. Conclusion

It is desirable to provide an image forming apparatus with security that makes a confidential (nondisclosed) document unremovable by a different person. For example, according to a conceivable technology, ejected paper is locked. However, some image forming apparatuses may have a small number of ejection trays (for example, one ejection tray). A plurality of users use an image forming apparatus. It is not desirable for the image forming apparatus to lock ejected paper every time the image forming apparatus ejects paper, since it is inconvenient for other users.

To the contrary, firstly, according to the present embodiment, if the number-of-sheet(s) of paper is smaller than the threshold (Step S106, YES), and if the distance from a user (user who has the mobile device 30) to the MFP 10 is smaller than the first distance (Step S107, YES), the MFP 10 immediately forms an image on paper (Step S108). In other words, if the number-of-sheet(s) of paper is relatively small, and if it takes a relatively short time for the user to arrive at the MFP 10, the MFP 10 immediately prints the image on paper. As a result, the printed paper is ejected onto an ejection tray when the user is about to arrive at the MFP 10. As a result, there is no security problem without physically locking the paper, and the user's wait time is not increased.

Further, the larger the number-of-sheet(s) of paper, the larger the "first distance" from a user (user who has the mobile device 30) to the MFP 10. As a result, the printed paper is highly likely to be ejected onto an ejection tray when the user is about to arrive at the MFP 10. As a result, the security is further increased.

However, after printing, a different person may come near the MFP 10 before the user arrives at the MFP 10. In view of the aforementioned circumstances, if there is a different person, a distance from the different person to the MFP 10 being smaller than a third distance (Step S109, YES), the ejected paper is locked such that the paper is physically unremovable (Step S110) to increase the security. As a result, the different person cannot remove the paper. Further, if it is determined that the distance from the user is smaller than the second distance, the paper is unlocked (Step S112). As a result, only after the user comes near the MFP 10, the paper is physically removable.

Secondly, according to the present embodiment, if the number-of-sheet(s) of paper is equal to or larger than the threshold (Step S106, NO), the MFP 10 immediately forms an image on paper (Step S113), and locks the ejected paper such that the paper is physically unremovable (Step S110). In other words, if the number-of-sheet(s) of paper is relatively large, the MFP 10 immediately starts printing irrespective of the distance from the user to the MFP 10. As a result, the user's wait time is reduced as short as possible. However, if printed paper is put on an ejection tray before the user arrives at the MFP 10, a different person may remove the paper. In view of the aforementioned circumstances, after printing, the paper is immediately locked such that the paper is physically unremovable. As a result, the security is increased. As a result, the different person cannot remove the paper. Further, if it is determined that the distance from the user is smaller than the second distance, the paper is unlocked (Step S112). As a result, only after the user comes near the MFP 10, the paper is physically removable.

Further, according to the present embodiment, the printable data converting module 102 converts printable data received from the PC 20 into data (bitmap data) in a character-recognizable format (Step S102). As a result, when printing, the MFP 10 forms an image based on the bitmap data. Therefore it is possible to shorten the time from the start of the printing to the end of the printing.

It should be understood by those skilled in the art that various modifications, combinations, sub-combinations and alterations may occur depending on design requirements and other factors insofar as they are within the scope of the appended claims or the equivalents thereof.

What is claimed is:
1. An image forming apparatus, comprising:
   a network communication device capable of communicating with an information processing apparatus connected to a network;
   a printer capable of forming an image on a paper;
   a lock mechanism that locks the paper on which the image is formed by the printer such that the paper is unremovable; and
   a processor that
     obtains printable data from the information processing apparatus, a user having logged in to the information processing apparatus,
     determines whether a number-of-sheet(s) of the paper required to form an image based on the printable data is equal to or larger than a threshold or smaller than the threshold,
     if it is determined that the number-of-sheet(s) of the paper is smaller than the threshold, determines whether a distance from the user is equal to or larger than a first distance or smaller than the first distance,
     if it is determined that the distance from the user is smaller than the first distance, controls the printer to form the image on the paper, and
     if it is determined that the distance from the user is equal to or larger than the first distance, and if it is determined that the distance from the user is changed such that the distance from the user is smaller than the first distance, controls the printer to form the image on the paper, wherein
   the processor,
     if it is determined that the distance from the user is smaller than the first distance, and if the processor controls the printer to form the image on the paper, determines whether or not there is a different person different from the user, a distance from the different person being smaller than a third distance, the third distance being smaller than the first distance,
     if it is determined that there is the different person, the distance from the different person being smaller than the third distance, controls the lock mechanism to lock the paper such that the paper is unremovable from the image forming apparatus, and
     if it is determined that the distance from the user is smaller than a second distance, the second distance being smaller than the first distance and equal to the third distance, unlocks the paper.
2. The image forming apparatus according to claim 1, wherein the processor makes the first distance variable depending on the number-of-sheet(s) of the paper such that as the number-of-sheet(s) of the paper increases, the first distance increases.

3. The image forming apparatus according to claim 1, wherein
the processor
determines whether or not the image is confidential based on the printable data,
if it is determined that the image is confidential, determines whether the number-of-sheet(s) of the paper is equal to or larger than the threshold or smaller than the threshold, and determines whether the distance from the user is equal to or larger than the first distance or smaller than the first distance, and
if it is determined that the image is not confidential, controls the printer to form the image on the paper.

4. The image forming apparatus according to claim 3, wherein
the processor
converts the printable data into data described in a character-recognizable format, and
determines whether or not the data after conversion contains characters with meaning of confidence, and thereby determines whether or not the image is confidential.

5. A non-transitory computer readable recording medium that records an information processing program executed by a processor of an image forming apparatus including
a network communication device capable of communicating with an information processing apparatus connected to a network,
a printer capable of forming an image on a paper, and
a lock mechanism that locks the paper on which the image is formed by the printer such that the paper is unremovable,
the information processing program causing the processor of the image forming apparatus to:
obtain printable data from the information processing apparatus, a user having logged in to the information processing apparatus;
determine whether a number-of-sheet(s) of the paper required to form an image based on the printable data is equal to or larger than a threshold or smaller than the threshold;
if it is determined that the number-of-sheet(s) of the paper is smaller than the threshold, determine whether a distance from the user is equal to or larger than a first distance or smaller than the first distance;
if it is determined that the distance from the user is smaller than the first distance, control the printer to form the image on the paper; and
if it is determined that the distance from the user is equal to or larger than the first distance, and if it is determined that the distance from the user is changed such that the distance from the user is smaller than the first distance, control the printer to form the image on the paper, wherein
the information processing program further causes the processor of the image forming apparatus to,
if it is determined that the distance from the user is smaller than the first distance, and if the processor controls the printer to form the image on the paper,
determine whether or not there is a different person different from the user, a distance from the different person being smaller than a third distance, the third distance being smaller than the first distance,
if it is determined that there is the different person, the distance from the different person being smaller than the third distance, control the lock mechanism to lock the paper such that the paper is unremovable from the image forming apparatus, and
if it is determined that the distance from the user is smaller than a second distance, the second distance being smaller than the first distance and equal to the third distance, unlock the paper.

* * * * *